United States Patent [19]
Gummer

[11] Patent Number: 5,882,404
[45] Date of Patent: Mar. 16, 1999

[54] POWDER COATING APPARATUS

[76] Inventor: Edward Christopher Gummer, Abberley View, New Road, Cutnall Green Droitwich, Worcestershire, WR9 OPQ, United Kingdom

[21] Appl. No.: 607,098

[22] Filed: Feb. 26, 1996

[30] Foreign Application Priority Data

Feb. 25, 1995 [GB] United Kingdom .................. 9503821
Dec. 19, 1995 [GB] United Kingdom .................. 9525865

[51] Int. Cl.$^6$ .............................. B05C 11/00; B05B 7/00; B05B 3/00; B08B 3/00
[52] U.S. Cl. ............................ 118/70; 118/309; 118/603; 134/95.2; 134/95.3; 134/166 R; 134/111; 454/52; 454/53; 454/54; 454/56; 55/DIG. 46
[58] Field of Search .................................. 134/10, 21, 34, 134/37, 200, 104.1, 104.2, 105, 95.2; 118/70, 309, 603; 454/53, 52; 55/DIG. 46

[56] References Cited

FOREIGN PATENT DOCUMENTS 1 242 615 10/1988 Canada .
0 200 681 11/1986 European Pat. Off. .
0 369 484 5/1990 European Pat. Off. .

*Primary Examiner*—Ponnathapura Achutamurthy
*Assistant Examiner*—Hankyel T. Park
*Attorney, Agent, or Firm*—Smith-Hill and Bedell

[57] ABSTRACT

Powder coating apparatus (10) comprises an enclosure or booth (12) in which an article to be powder coated is locatable. Spray heads (24) are provided in the booth (12) to spray water over the inside of the booth (12) to remove over-spray powder coat material from the booth (12), following coating of an article, and removal thereof from the booth (12). Material washed from the booth (12) can be collected for recovery from the water.

32 Claims, 3 Drawing Sheets

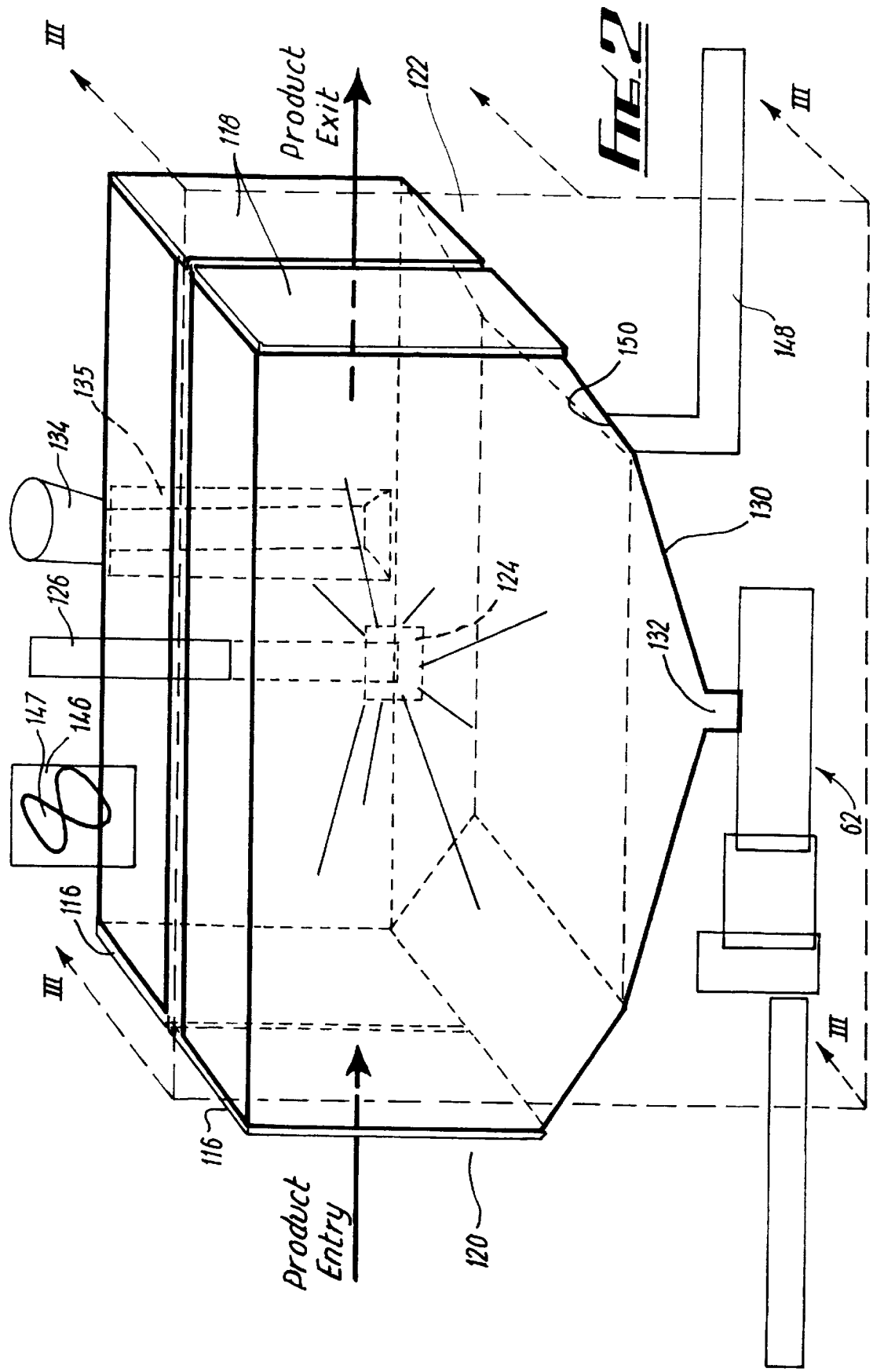

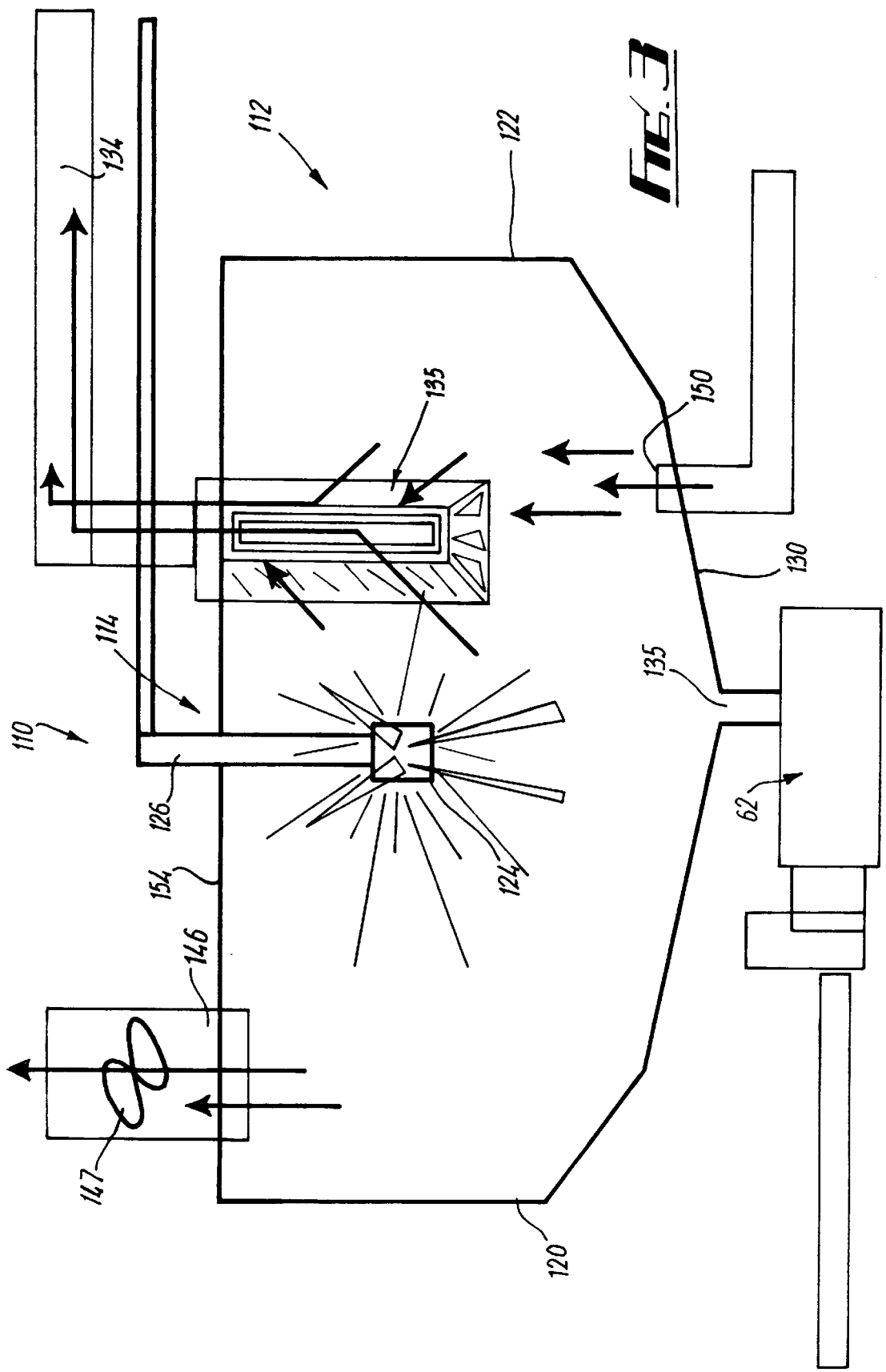

POWDER COATING APPARATUS

FIELD OF THE INVENTION

The present invention is concerned with improvements in or relating to powder coating apparatus, and in particular but not exclusively to the cleaning of powder coating apparatus.

BACKGROUND

Powder coating is a technique of coating a metallic article with paint or a similar substance. The paint is sprayed in dry powder form onto the article through a spray gun. The gun charges the powder particles with static charge such that they are attracted to the metal. The article is then passed into an oven, where the powder coating melts to form a flat coating on the article.

Spraying articles in this way results in a considerable amount of powder missing the article (so called overspray) and settling in the enclosure or booth in which the article is being sprayed. It is therefore desirable to recover this material for re-spraying.

Moreover, it is important that this material is recovered from the enclosure or booth when the colour of material to be sprayed is changed, otherwise cross contamination of colours of material will occur.

Conventionally, recovery of such material is done by either sucking the excess powder into an airline, or alternatively by blowing the powder with an airline into a collecting chamber. These techniques have the drawbacks of causing the powder to become airborne and thus difficult to recover. Moreover airborne powder coat material presents both health and environmental hazards.

Further, using such airlines to collect overspray tends to increase the static charge of the particles, and hence their affinity to the walls of the enclosure and other metal items thereby increasing the difficulty of their recovery.

SUMMARY OF THE INVENTION

It is an object of the present invention to obviate or mitigate the above disadvantages.

According to the present invention there is provided powder coating apparatus comprising washing means operable to introduce water from a water supply to the apparatus to wash powder coating material from the apparatus.

Preferably the powder coating apparatus further comprises an enclosure in which an article to be coated is locatable, and preferably means for spraying a coating material in powder form onto an article in the enclosure, the washing means being operable to introduce water from a water supply to the enclosure to wash coating material from the enclosure. The washing means may be a component of the coating apparatus.

Preferably the washing means is operable to introduce water comprising surfactant such as a detergent, desirably with a low concentration of the surfactant.

Preferably the washing means is operable to introduce water over substantially the whole of the inside of the enclosure to wash powder coating material therefrom. The washing means may comprise one or more spray heads operable to spray water over the inside of the enclosure, preferably subsequent to a coated article having been removed from the enclosure. Preferably the spray head(s) is/are arranged to spray generally in all directions.

Additionally the washing means may be operable to introduce water over the outside of the apparatus, and may comprise a chamber into which that apparatus is locatable for washing.

Preferably collecting means is provided to collect the water and powder coating material mixture washed from the apparatus. The collecting means may comprise a formation operable to channel the mixture toward an outlet in the enclosure. The formation may comprise a slope on the base of the enclosure, sloping downward toward an outlet in the base.

Preferably separating means is provided to separate water and coating material therein washed thereby from the apparatus. The separating means may comprise a filter to separate said material from the water. Means may be provided to recover the separated material for re-use or disposal.

Preferably the apparatus further comprises drying means to dry the apparatus following washing with water. The drying means may comprise one or more blowers operable to blow air, preferably hot air over and/or through the apparatus or enclosure. The hot air may be generated using heat produced by nearby powder coating ovens. An outlet is preferably provided in the enclosure to permit steam produced by the drying means to be exhausted from the enclosure.

Preferably means is provided to remove airborne coating material from the enclosure. The removal means may comprise suction apparatus in communication with the enclosure and operable to suck airborne coating material from within the enclosure desirably during spraying of an article. The removal means may be connected to or comprise means to collect and desirably recover the material removed thereby.

Preferably the enclosure comprises one or more openings in at least one side thereof through which the spraying means can be inserted to spray an article in the enclosure. The opening(s) are preferably substantially self-sealing to prevent water from escaping therethrough during the washing of the enclosure, desirably whether the spray means has been withdrawn from the enclosure or not. Preferably sealing doors are also provided through which an article to be sprayed is introduced into and removed from the enclosure.

Preferably the coating apparatus is computer controlled to provide automated washing and drying of the enclosure. The apparatus may provide for continuous spraying, washing and drying cycles. The apparatus may be arranged to receive an article to be sprayed on a conveyor, spray the article and release the article following completion of spraying.

The invention may further provide washing means for powder coating apparatus, the washing means being substantially as defined in any of the preceding eleven paragraphs.

According to a further aspect of the present invention there is provided a method of washing powder coat spraying apparatus comprising washing the apparatus with water to remove powder coating material thereon.

Preferably the method comprises washing with water comprising surfactant such as detergent, desirably with a low concentration of the surfactant. Preferably the water is sprayed over the apparatus, and desirably all over the inside of the apparatus when the apparatus comprises an enclosure in which articles are sprayed with powder coating material. The apparatus is washed following removal of the sprayed article from the enclosure. Preferably the water and material mixture washed from the apparatus is collected, preferably for recovery of the material and desirably also of the water. The material and water may be separated by a filter.

Preferably airborne material produced during spraying is removed desirably from within an enclosure of the apparatus in which an article is sprayed, desirably by suction, preferably during spraying of the powder coating material. Preferably the removed material is recovered desirably for re-spraying.

Preferably the method further comprises drying the apparatus following removal of the said material. The drying may be effected by one or more streams of hot air passed over the surface(s) of the apparatus being dried. The air may be heated by nearby powder coating ovens.

Preferably the method is automatically carried out, and is desirably computer controlled.

Preferably the method is conducted at a location removed from the site at which articles are sprayed with powder coating material, such that spraying may be continued with another spraying apparatus whilst the said apparatus is washed.

BRIEF DESCRIPTION OF THE DRAWINGS

An embodiment of the present invention will now be described by way of example only, with reference to the accompanying drawings, which is:

FIG. 2 is a diagrammatic perspective representation of powder coating spraying apparatus according to a second embodiment of the present invention; and FIG. 3 is a diagrammatic longitudinal cross-sectional view in the plane III—III of the apparatus of FIG. 2.

Figure 1:
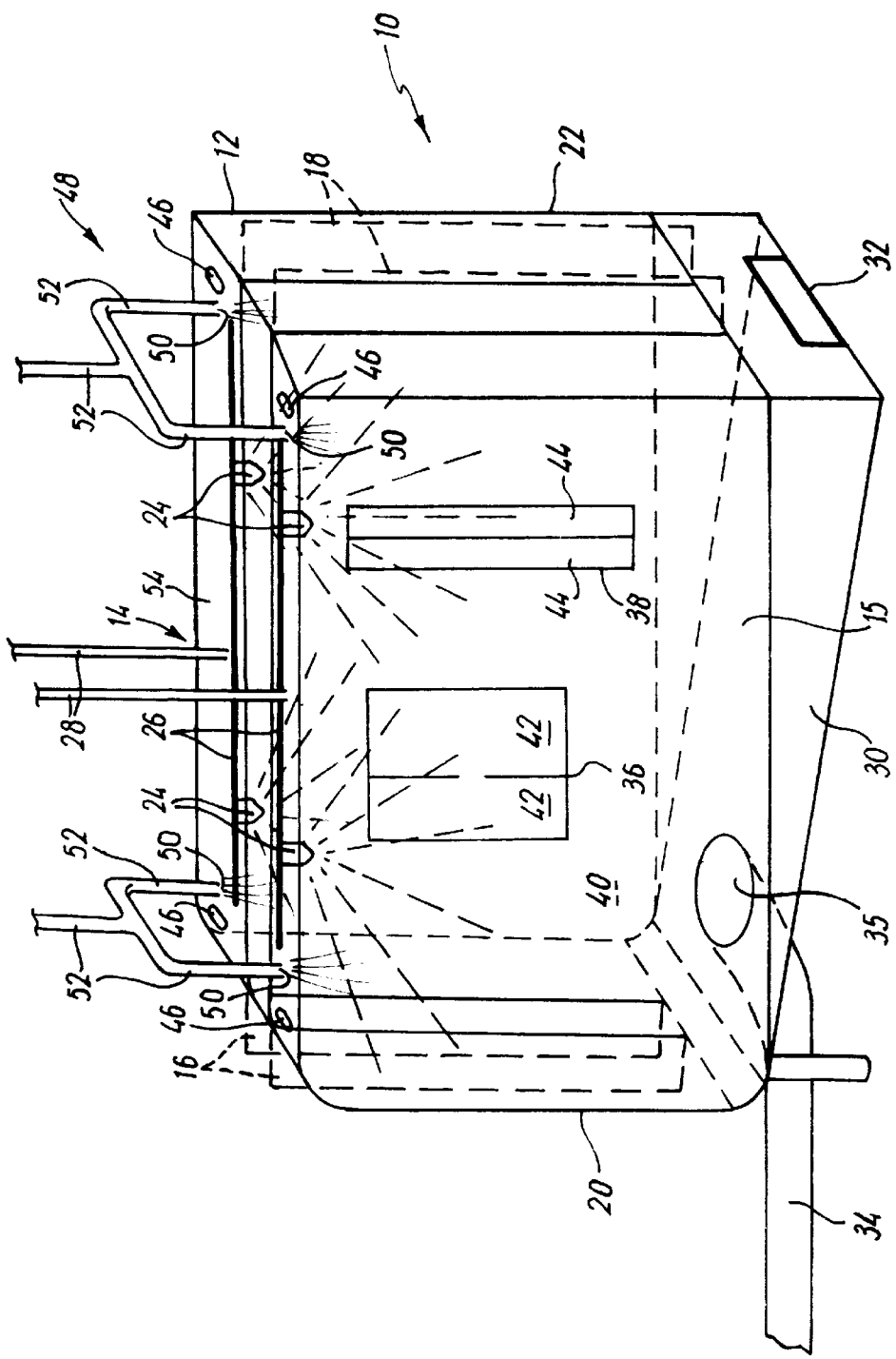
FIG. 1 is a diagrammatic perspective representation of powder coat spraying apparatus according to one embodiment of the present invention.

Referring to the drawing, powder coating apparatus 10 comprises washing means 14 operable to introduce water from a water supply to the apparatus 10 to wash powder coating material from the apparatus 10.

DETAILED DESCRIPTION

In more detail the apparatus 10 further comprises an enclosure or booth 12 in which an article (not shown) to be coated is locatable, means (not shown) for spraying a coating material in powder form onto an article in the booth 12. The washing means 14 is operable to introduce water from a water supply (not shown) to the booth 12 to wash oversprayed coating material from the inside of the booth 12.

The booth 12 is of generally rectangular configuration and defines a chamber 15 in which an article to be powder coated is locatable. Two pairs of doors 16,18 are provided one in each respective opposing end 20,22 of the booth 12, to provide access for articles to the interior of the booth 12. The doors 16,18 are shown in the closed condition, and in the open condition in dotted outline. The doors 16,18 open and close automatically as an article enters and exits the booth 12.

The washing means 14 comprises four spray heads 24 connected via respective conduits 26 to water supply conduits 28 that in turn connect to the water supply (not shown). The heads 24 are located generally at the top of the booth 12 such that when water is supplied thereto, the water is sprayed over the whole of the inside of the booth 12 to provide thorough washing of the booth 12 as will be explained.

It is to be appreciated that any suitable number and configuration of spray heads 24 can be used.

The base 30 of the booth 12 is inclined downwardly towards an outlet 32, which is in turn connected to separating means (not shown). A suction conduit 34 is in communication with the inside of the booth 12 via an opening 35 in the base 30, generally toward the upper end of the base 30. The conduit 34 is attached to suction means (not shown).

Further openings 36,38 are provided in one side 40 of the booth. Each of the openings 36,38 is closable by a respective pair of door members 42,44, and provide access for spraying equipment such as a spray gun (not shown) into the booth 12. The door members 42,44 automatically close behind the spraying equipment, when the spraying equipment is retracted from within the booth 12, to thereby effectively seal the openings 36,38. Further, the door members 42,44 may be resilient and able to close around spray equipment so that the openings 36,38 are substantially sealed even when the equipment is extending therethrough into the booth 12.

Drying means 48 is provided generally at the top of the booth 12, and comprises four air jets 50 in communication with the chamber 16 and connected via respective conduits 52 to a blower (not shown).

Vents 46 are also provided in the top side 54 of the booth 12 to provide outlets through which steam may vent, as will be explained.

In use, an article to be powder coated is located in the booth 12, through the first set of doors 16. Once located in the booth, spraying equipment is entered into the booth 12 through one or both of the openings 36,38. The article is then sprayed with a desired colour using conventional powder coating techniques. Once sprayed the article is moved out of the booth 12 through the doors 18.

The suction means (not shown) sucks airborne oversprayed material from within the booth 12 through the conduit 34, during the spraying process to thereby minimise the amount of powder to be washed out. The powder sucked out is recovered for re-use. The spraying of different articles may continue in this way, until it is desired to change the colour of the material being sprayed. To enable this, the booth 12 must be washed and a new material supply and spraying equipment employed. The spraying equipment is thus retracted from within the booth 12, with the respective door members 42,44 sealingly closing therebehind.

The washing means 14 is then activated by supplying water from the water supply along the conduits 28,26 to the spray heads 24. The water, which includes a low concentration of detergent, is sprayed over the whole of the inside of the booth 12, to wash the excess powder coating material, so called overspray, from the inside surfaces of the booth 12. The water effectively removes the material from the surfaces of the booth 12. The detergent counters the charges in the material particles which may be acting to attract the particles to the inside of the enclosure, to assist removal.

The water and material mixture drains down the sides of the booth 12, and down the sloped base 30 toward the outlet 32. The mixture is then conveyed to the separating means, which comprises a filter and the powder coating material is separated from the water thereby. The separated water and material may then be disposed of, or alternatively recovered for re-use, perhaps following further processing thereof.

Once the washing procedure is complete, and the booth 12 is substantially free from oversprayed material, hot air is blown into the booth 12 through the jets 50, to substantially dry the inside of the booth 12. The hot air may be heated using heat generated by nearby powder coating ovens for curing the sprayed material on the articles. The vents 46 provide outlets through which steam generated by the hot air can leave the chamber 16. Once the booth 12 has been dried, it is ready to accommodate the spraying of a different colour of material.

It is to be appreciated that it is necessary to wash the booth 12 when the colour of the material being sprayed is changed, although it can of course be washed when desired. Using conventional techniques, the cleaning of the booth 12 is a laborious, time consuming and hazardous operation, whereas the apparatus and method of the present invention provide for quick, efficient and safe washing.

FIGS. 2 and 3 show apparatus 110 according to a second embodiment of the present invention. The features of the second embodiment are similar to those of the first embodiment described above, and respective features have been given a corresponding reference numeral prefixed with a "1".

The apparatus 110 has a single spray head 124 extending down into the booth 112 to be generally centrally located therein. The head 124 is arranged to spray water supplied thereto substantially in all directions to ensure that the whole of the inside of the booth 112 is sprayed and thereby cleaned. A suction conduit 134 opens into the booth 112 via an opening 135 which generally flares out into the booth 112 to direct powder being drawn by the suction, into the conduit 134. The conduit 134 is attached to the suction means (not shown).

A single vent 146 is provided in the top 154 of the booth 112 to provide the outlet for steam generated by drying means 148 which is operable to blow hot air into the booth through an opening 150 in the base 130 of the booth 112 to dry the booth 112 following washing. The vent may comprise a fan 147 to draw steam from the booth 112. The base 130 of the booth 112 has a generally conical cross-section, tapering toward the centre thereof to to direct water draining from the booth 112 into an outlet 132. The outlet 132 is connected via a conduit 60 to a separating arrangement 62 which separates the water from the coating material washed from the booth 112 thereby and suspended therein, by filtration or any other suitable means. The water and material may then be recovered for reuse or disposal.

Various modifications may be made without departing from the spirit or scope of the present invention. For example, the booth 12 could be of any size, and the introduction and removal of the article therein can be effected in any suitable way, either through doors or otherwise. The water may be introduced into the booth by any appropriate means, for example it may be run down each of the walls of the booth. The means for introducing the air may be of any suitable type and configuration. The apparatus may be automated to provide for automatic cleaning of the apparatus at predetermined times.

The booth may be removed from the spraying site to be cleaned, such that whilst the booth is being washed according to the invention, a further, clean booth can replace it at the spraying site such that spraying can continue. This is advantageous since even though the time taken to wash the apparatus according to the present invention is significantly shorter than the time taken using conventional techniques, it still presents a down-time when spraying cannot be conducted, unless it is removed in this way.

The removed, dirty booth will then be mated up to washing apparatus which will extend one or more water jets, such as a ring of spray jets into the booth, and thereby introduce water to the inside of the booth to clean the booth. Once cleaning is complete, one or more hot air nozzles are inserted into the booth to dry it. The spray jets may also comprise the hot air nozzles, and as such are connected to both a water supply and a hot air supply. Once the booth is cleaned in this way, it is ready to replace a further, dirty booth.

A further variation of the apparatus is to provide a washing chamber into which a dirty booth is located to be cleaned. The chamber comprises water introducing means that for example sprays water all over the booth to wash it, and then blows air all over the booth to dry it. In this way the booth can be cleaned inside and outside, according to the relative positions of the booth and the spraying and blowing means in the washing enclosure.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. Improvements in powder coating apparatus apparatus comprising an enclosure in which an article to be coated is locatable, the improvements comprising washing means operable to introduce water from a water supply to the enclosure to wash powder coating material from the enclosure, and further comprising drying means operable to dry the enclosure following washing with water and prior to powder coating recommencing.

2. Apparatus as claimed in claim 1, in which the apparatus comprises means for spraying a coating material in powder form onto an article in the enclosure.

3. Apparatus as claimed in claim 1, in which the washing means comprises further means operable to introduce surfactant to the water for washing.

4. Apparatus as claimed in claim 3, in which the further means is operable to introduce detergent to the water.

5. Apparatus as claimed in claim 3, in which the further means is operable to introduce surfactant to produce a low concentration of the surfactant in the water.

6. Apparatus as claimed in claim 1, in which the washing means is operable to introduce water over substantially the whole of the inside of the enclosure to wash powder coating material therefrom.

7. Apparatus as claimed in claim 1, in which the washing means comprises one or more spray heads operable to spray water over the inside of the enclosure.

8. Apparatus as claimed in claim 7, in which the or each spray head is arranged to spray substantially in uniformaly in all directions.

9. Apparatus as claimed in claim 1, in which the washing means is operable to introduce water over the outside of the apparatus.

10. Apparatus as claimed in claim 1, in which a chamber is provided into which that apparatus is locatable for washing.

11. Apparatus as claimed in claim 1, in which collecting means is provided to collect the water and powder coating material mixture washed from the apparatus.

12. Apparatus as claimed in claim 11, in which the collecting means comprises a formation operable to channel the mixture toward an outlet in the enclosure.

13. Apparatus as claimed in claim 12, in which the formation comprises a slope on the base of the enclosure, sloping downward toward an outlet in the base.

14. Apparatus as claimed in claim 1, in which separating means is provided to separate water and coating material therein washed thereby from the apparatus.

15. Apparatus as claimed in claim 14, in which the separating means comprises a filter to separate said material from the water.

16. Apparatus as claimed in claim 14, in which means is provided to recover the separated material for re-use or disposal.

17. Apparatus as claimed in claim 1, in which the drying means comprises one or more blowers operable to blow air over and/or through the apparatus.

18. Apparatus as claimed in claim 17, in which the blown air is heated.

19. Apparatus as claimed in claim 18, in which the heated air is generated using heat produced by nearby powder coating ovens.

20. Apparatus as claimed in claim 1, in which an outlet is provided in the enclosure to permit steam produced by the drying means to exhaust from the enclosure.

21. Apparatus as claimed in claim 1, in which means is provided to remove airborne coating material from the apparatus.

22. Apparatus as claimed in claim 21, in which the removal means comprises suction apparatus in communication with the enclosure and operable to suck airborne coating material from within the enclosure.

23. Apparatus as claimed in claim 21, in which the removal means is operable during spraying of an article.

24. Apparatus as claimed in claim 21, in which the removal means is connected to or comprises means to collect and desirably recover the material removed thereby.

25. Apparatus as claimed in claim 1, in which the enclosure defines one or more openings in at least one side thereof through which spraying means can be inserted to spray an article in the enclosure.

26. Apparatus as claimed in claim 25, in which sealing means is provided to substantially seal the opening(s) to prevent water from escaping therethrough during the washing of the enclosure.

27. Apparatus as claimed in claim 26, in which the openings self-seal whether the spraying means has been withdrawn from the enclosure or not.

28. Apparatus as claimed in claim 1, in which sealable doors are provided through which an article to be sprayed is introduced into and removed from the enclosure.

29. Apparatus as claimed in claim 1, in which the coating apparatus is computer controlled to provide automated washing and drying of the enclosure.

30. Apparatus as claimed in claim 1, in which the apparatus provides for continuous spraying, washing and drying cycles.

31. Apparatus as claimed in claim 1, in which the apparatus is arranged to receive an article to be sprayed on a conveyor, spray the article and release the article following completion of spraying.

32. Washing means for powder coating apparatus, the washing means being substantially as in claim 1.

\* \* \* \* \*